May 25, 1971 J. A. PAGET 3,580,804
LIFTING MECHANISM AND REFUELING MACHINE
Filed March 7, 1969 5 Sheets-Sheet 1

INVENTOR
JOHN A. PAGET

ATTY.

INVENTOR
JOHN A. PAGET

ATTY.

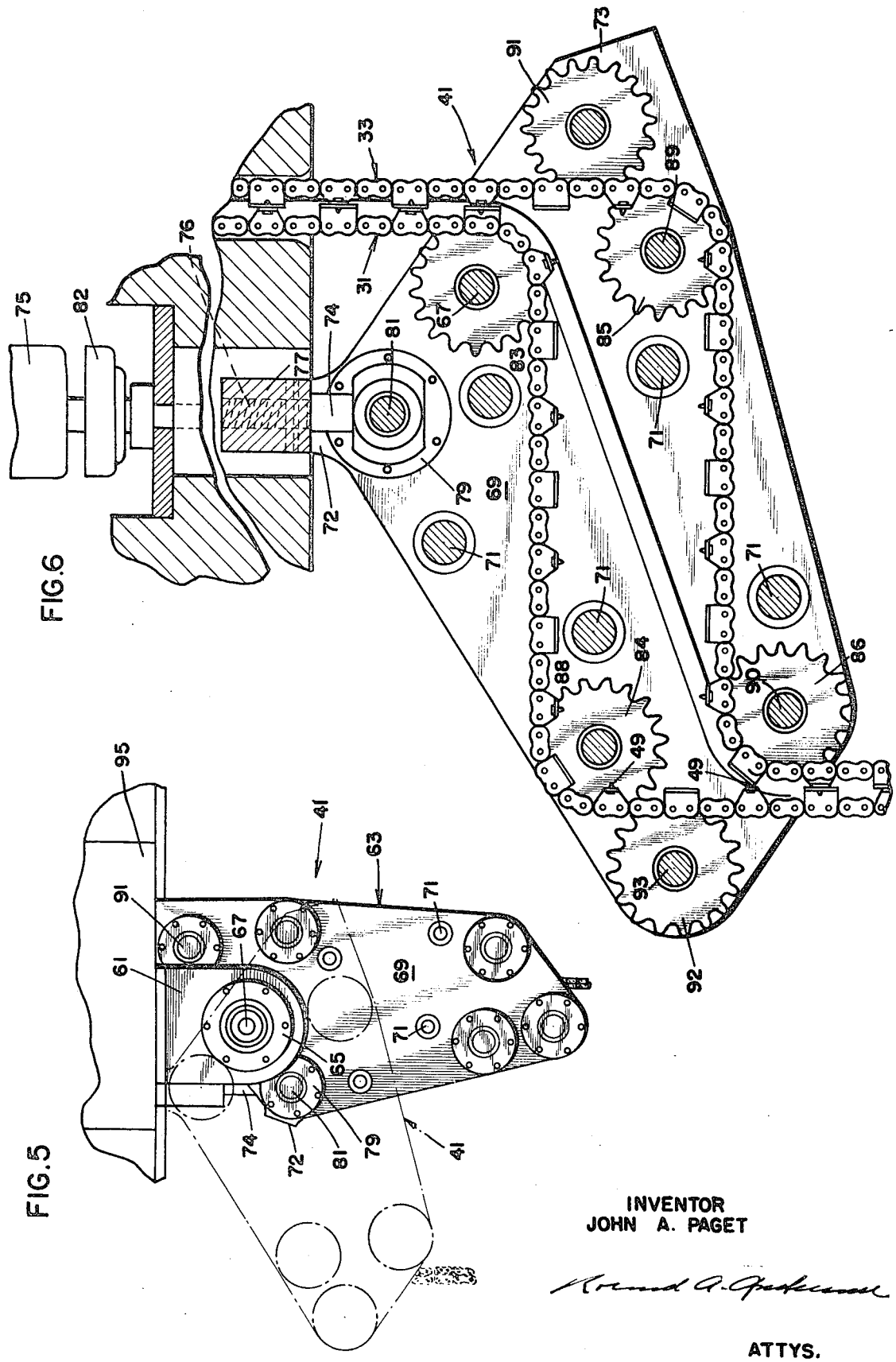

May 25, 1971  J. A. PAGET  3,580,804
LIFTING MECHANISM AND REFUELING MACHINE
Filed March 7, 1969  5 Sheets-Sheet 4

INVENTOR
JOHN A. PAGET

ATTY.

INVENTOR
JOHN A. PAGET

ATTY.

United States Patent Office 3,580,804
Patented May 25, 1971

3,580,804
LIFTING MECHANISM AND REFUELING MACHINE
John A. Paget, Imperial Beach, Calif., assignor to the United States of America as represented by the United States Atomic Energy Commission
Filed Mar. 7, 1969, Ser. No. 805,156
Int. Cl. G21c *19/20*
U.S. Cl. 176—30                    11 Claims

ABSTRACT OF THE DISCLOSURE

A composite lifting chain is formed with an interior, protected space for service lines such as electrical or pneumatic lines. To facilitate compact storage and winding of the composite chain, as within a limited storage space in a nuclear fuel handling machine, the composite chain is separated into first and second chains or portions which are wound on separate reeling mechanisms. Within the fuel handling machine, the composite chain may be bent and offset laterally by a chain displacement mechanism to align a grapple connected to its lower end with nuclear core elements or other devices stored therein.

---

This invention relates to a lifting mechanism and to a composite lifting chain for lifting heavy loads while protecting one or more service lines, such as electrical or pneumatic lines, disposed in a protected space in the interior of the composite lifting chain. The present invention also relates to a machine having a lifting mechanism of this kind for loading and refueling a nuclear reactor core.

The lifting mechanism is described herein in connection with a fuel element handling or refueling machine which is connected to the top of a pressure vessel for a gas cooled, reactor core and which permits penetration into the core area through nozzles in which normally reside drive mechanisms for control rods. As disclosed in greater detail in J. A. Paget, Core Element Handling System, Pat. No. 3,383,286, core elements may be lifted generally axially upward from the reactor core through the nozzles into the refueling machine which is tightly sealed to the pressure vessel to prevent escape of the cooling gas. As described in the aforesaid patent, reactor cores may be comprised of a lattice of block shaped core elements stacked in vertical columns and arranged in substantially horizontal layers. In the patented system, the refueling process involved lifting of core elements from a region of a horizontal layer beneath a nozzle whereas with the reactor core and refueling process described herein, vertical columns of core elements are lifted through a nozzle.

A lifting mechanism for reactor core elements must meet rigorous requirements of lifting heavy loads while being exposed to radiation, high temperatures and high vacuum. Ordinary lubrication of the lifting mechanism or composite chain to prevent wear is not readily feasible. The service lines are protected to prevent damage thereto as this could result in the loss of ability to manipulate loads properly. The requirements of protecting the service lines and lifting heavy loads work at cross purposes to the goals of having a lifting chain which is lightweight and which can be stored compactly in a limited space. That is, conventional large diameter cables or the like are not capable of being wound on small diameter winches or drums and, hence, require storage spaces which have a large dimension to accommodate the diameter of such a winding drum or winch. While it would be possible to increase the space in the refueling machine for storing large diameter drums and cables, the cost of providing such a sealed and pressure resistant space becomes quite significant.

Accordingly, general objects of the present invention are to provide a new and improved composite chain, a lifting mechanism and a refueling machine having such a lifting mechanism.

Other objects and advnatages of the invention will become apparent from the detailed description taken in connection with the accompanying drawings in which:

FIG. 5 is an elevational view showing a chain displacement mechanism in each of its two limit positions;

FIG. 6 is an enlarged sectional view of the chain displacement mechanism of FIG. 5;

Figure 1:
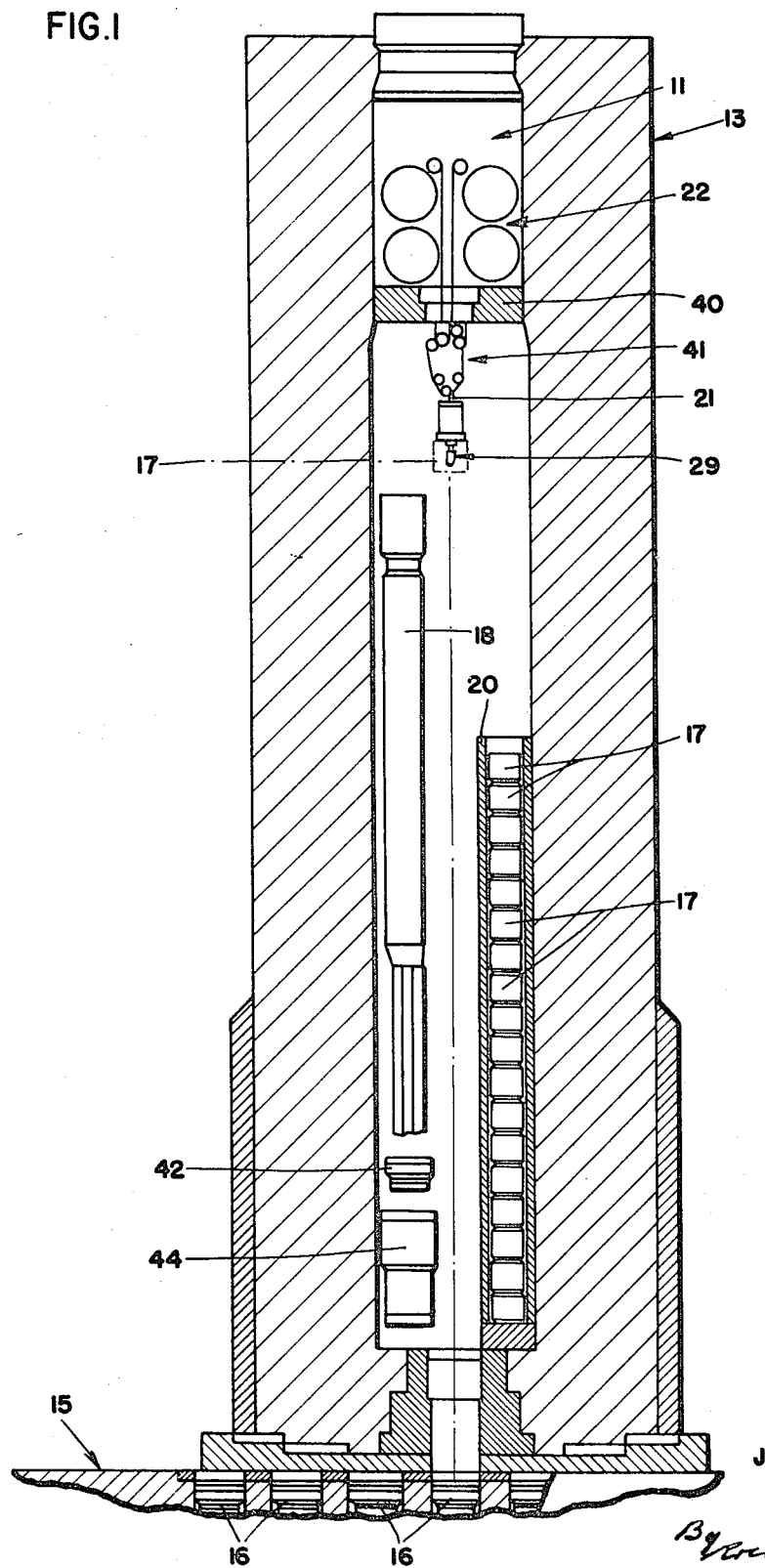
FIG. 1 is a sectional view of a refueling machine positioned over a nozzle of a pressure vessel of a reactor core.
Figure 2:
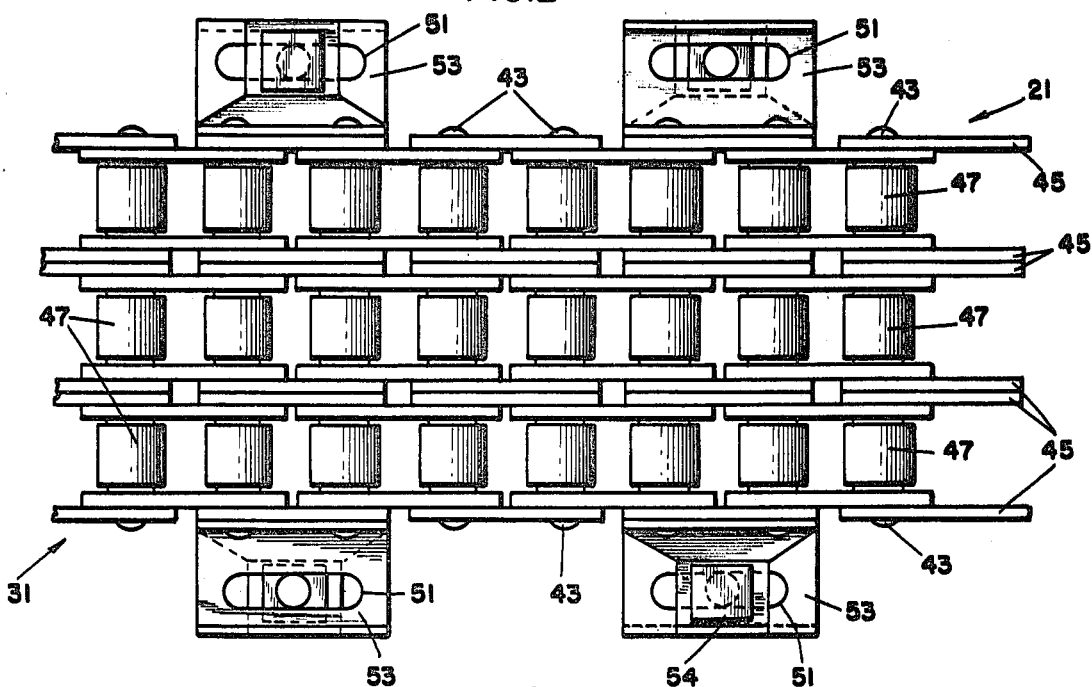
FIG. 2 is a fragmentary view of a pair of chains interlocked to constitute a composite lifting chain.

Generally, as shown in the drawings for purposes of illustration, the invention is embodied in a lifting mechanism 11 disposed in the interior of an enclosed refueling machine or vessel 13 which is superimposed over a sealed pressure vessel 15 containing a reactor core (not shown). The pressure vessel may be penetrated from the top through each of a plurality of hollow, cylindrical vertically extending control rod nozzles 16 through which may be inserted a block shaped core element 17 or an elongated control rod mechanism 18 illustrated in the refueling machine 13. The illustrated refueling machine 13 is used for on-line refueling of reactor cores formed of a lattice arranegment of vertical columns of fuel and reflector elements. Spent fuel elements or reflector elements are removed from the reactor core and replaced by new fuel elements such as those shown as being stored in a storage rack 20 in the refueling machine.

Very generally, the lifting mechanism 11 within the refueling machine 13 includes a hoist or reel means 22 for a composite lifting chain 21 (FIGS. 1–5) in the interior of which are service lines 23, 25 and 27 (FIG. 4) for operating suitable remote controls of a handling mechanism in the form of a grapple 29 attached to the lower end of the lifting chain 21.

As the lifting chain is lowered through the nozzles 16 in the pressure vessel 15 and into the reactor core, which is of the gas cooled kind, the chain is exposed to high temperatures, for example 750° F., and to conditions equivalent to a high vacuum and high radiation. Such radiation and high temperatures interfere with conventional lubricating techniques used to reduce internal or external wear for lifting chains used in operations in ambient atmospheric conditions. Yet the chain 21 must lift heavy loads without significant wear or chance of failure. Also, as the storage space for the lifting chain is limited and expensive in such an on-line refueling machine, the lifting chain should be capable of compact storage. Moreover, the lifting chain should protect service lines such as pneumatic and electric lines 23, 25 and 27, which serve to operate the grapple 29 against abutting or otherwise contacting other apparatus in the interior of the fuel handling machine. Furthermore, the lifting chain 21 should not drift laterally, when exposed to the flow of the helium gas through the fuel handling machine 13, as this may result in a misalignment of the grapple with a column of fuel elements or other devices. It is preferred that the lifting chain 21 have sufficient torsional stiffness to resist rotation or turning the grapple 29 as such turning would change the orientation of the elements gripped by it.

Figure 10:
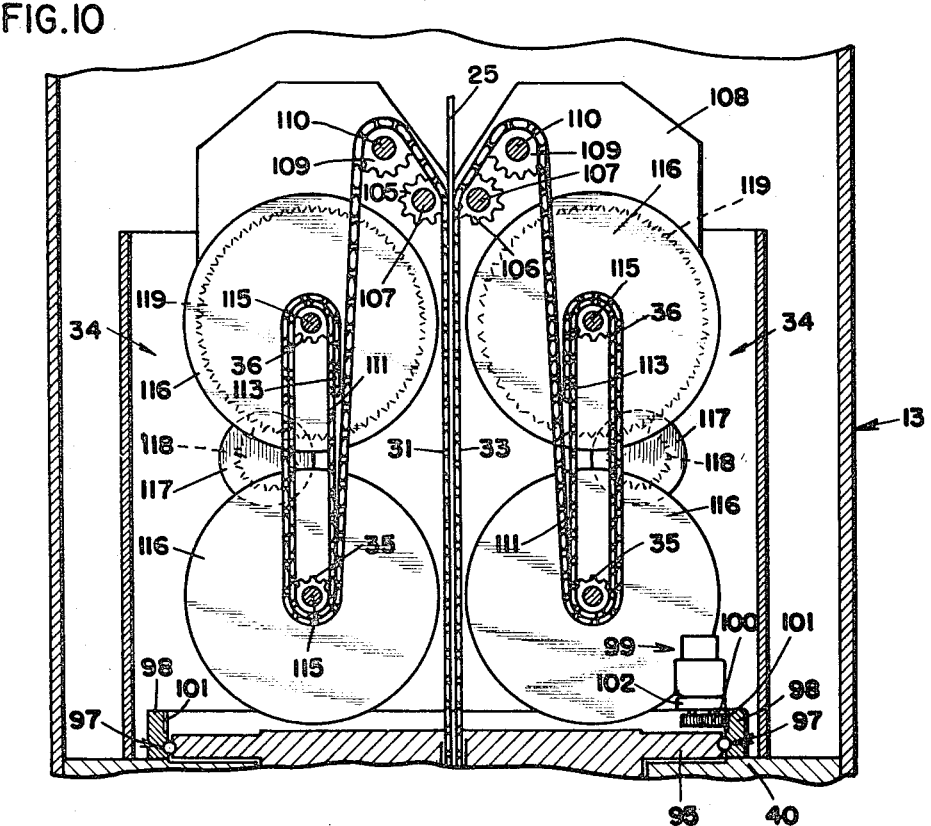
FIG. 10 is a fragmentary and partial sectional view of a reel mechanism for winding the lifting chain.
Figure 11:
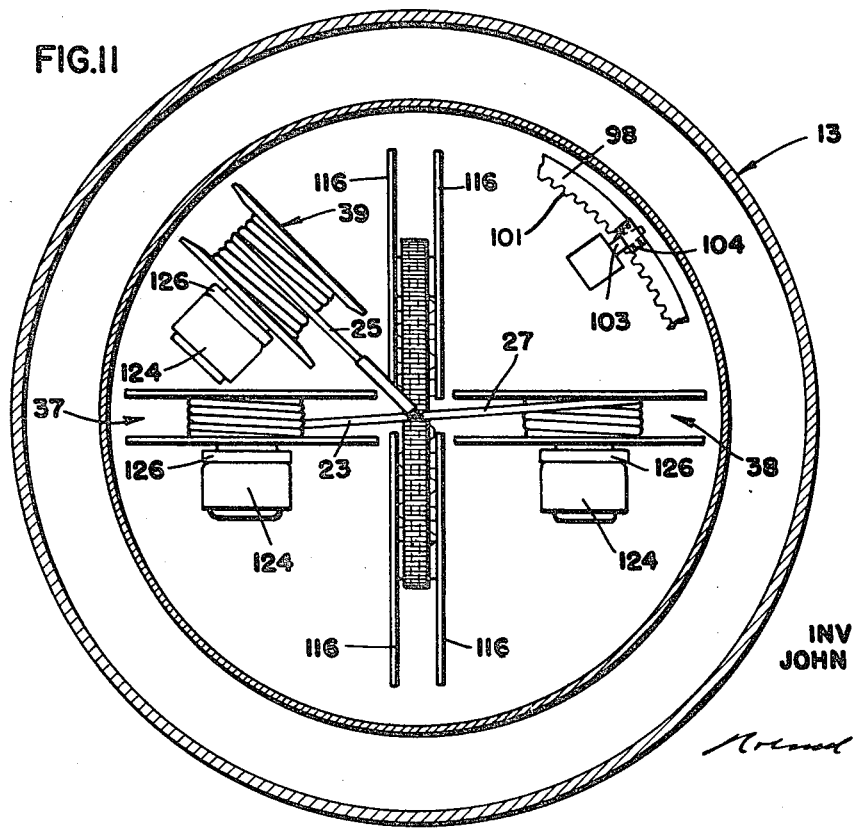
FIG. 11 is a plan, partial, sectional view for the electrical service lines and a pneumatic service line.

To meet such demanding criteria, the composite lifting chain 21 is formed with multiple-strand chains 31 and 33 (FIGS. 2–4), which have a protected inner space 32 therebetween in which are disposed the service lines 23, 25 and 27. Although composite lifting chain 21 is quite thick in cross section and capable of carrying heavy loads, it is readily separable into the multiple-chain strands 31 and 33 (FIGS. 2–4) having a cross section facilitating the bending and displacing thereof about smaller radii bends than would be a thick, conventional non-separable chain or cable. By separating the chain strands 31 and 33, the composite chain 21 may be stored in a smaller diameter space than it could otherwise be stored if not separated. Additionally, the separation of the chain strands facilitates chain storage in separate reel means 34 each winding the chain strands in obround loops about vertically spaced sprockets 35 and 36, as illustrated in FIG. 10. As will be explained, the service lines 23, 25 and 27 are stored on reels 37, 38 and 39, as illustrated in FIG. 11.

As best seen in FIG. 1, the lifting mechanism 11 is supported on a transversely extending support wall 40 with the grapple 29 positioned centrally of the vessel hollow interior for traveling along a path at the center line of the fuel handling machine 13. For the purpose of positioning the grapple 29 at positions offset laterally from its center line travel path, a chain displacement mechanism 41 separates the chain strands 31 and 33 for movement along separated paths, bends the separated strands and reunites the strands leaving the displacement mechanism. Thus, the displacement mechanism 41 is able to position the grapple 29 in positions aligned over the storage fuel rack 20 or the control rod assembly 18 which are disposed on opposite sides of the center line of the refueling machine.

Referring now in greater detail to the elements comprising the invention, the lifting mechanism 11 is disposed within the hollow interior of a generally cylindrically shaped, prestressed concrete, pressure vessel which is movable into position over each nozzle for servicing and refueling each reactor core region. The block shaped core elements 17 are hexagonal in horizontal cross section; and the core elements in the top layer of the core are metal clad and are provided with interlocking mechanical keys on the vertical sides thereof. Each core element 17 has a centrally disposed opening or pickup hole therein to receive the grapple 29.

As described in Pat. No. 3,383,286, a refueling operation involves removing the control rod, drive mechanism from the nozzle and the withdrawing of the core elements through the nozzle by simple grapple mechanism in a generally vertical straight line as is described in detail in this patent. In the patented system, the core elements were removed sequentially from a horizontal layer whereas in the illustrated and described system, the core elements are removed sequentially from a vertical column or stack. For either system the fuel handling machine is movable along the top of the reactor for positioning over each of the regions thereof and is adapted for sealed connection thereto through an isolation valve and sealing means to prevent the escape of the cooling gas, such as helium, which would readily escape if the refueling machine were not sealed to the pressure vessel 15. When pentrating the reactor core pressure vessel, the old control rod drive mechanism 18 for the penetrated nozzle is stored as well as its control rod nozzle plug 42 which is normally sealed and locked into the nozzle opening 18. Three storage racks suitable for new or spent fuel (only one of which is illustrated) are provided. Provision is also made for storing the old and replacement control rod assemblies and their nozzle plugs as well as two plugs 44 for closing the opening at the bottom of the refueling machine. A fuel chute (not shown) for guiding core elements to positions offset from the centerline of the refueling machine is accommodated in the refueling machine.

To lift heavy loads such as a fuel chute or a control rod drive mechanism 18, the multiple strand chains 31 and 33 (FIGS. 2–3) each are formed with three separate individual strands of roller chains disposed side by side. Common link pins 43 extend through aligned apertures in link plates 45 and interconnect the strands. Conventional chain rollers 47 encircle each of the common link pins 43 and are disposed between the link side plates 45 for each of the strands. The side plates and the link pins resist torsional forces tending to rotate the grapple thereby misaligning the core element carried by it.

Figure 3:
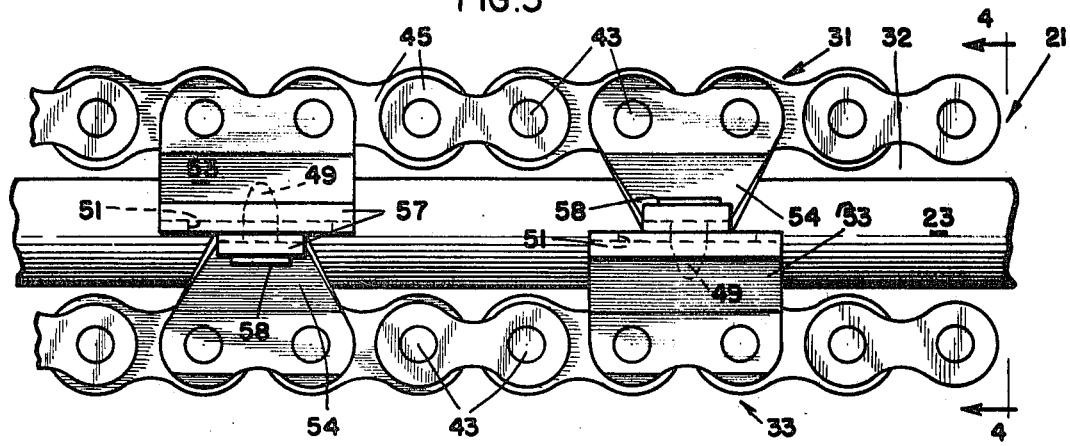
FIG. 3 is a side view of the composite lifting chain of FIG. 2.

The interlocking means for the multiple strand chains provides a rapid and automatic locking and unlocking of the triple strand chains 31 and 33. The preferred interlocking means includes locking pins 49 and pin receiving slots 51 on the interlocking or carrier plates 53 and 54 fastened to the outer and opposite sides of the triple strand chains 31 and 33. When these triple strand chains 31 and 33 are interlocked as illustrated in FIG. 3, the cables 23, 25 and 27 are enclosed in a protected casing against damage from engagement with other apparatus in the structure 13.

Figure 4:
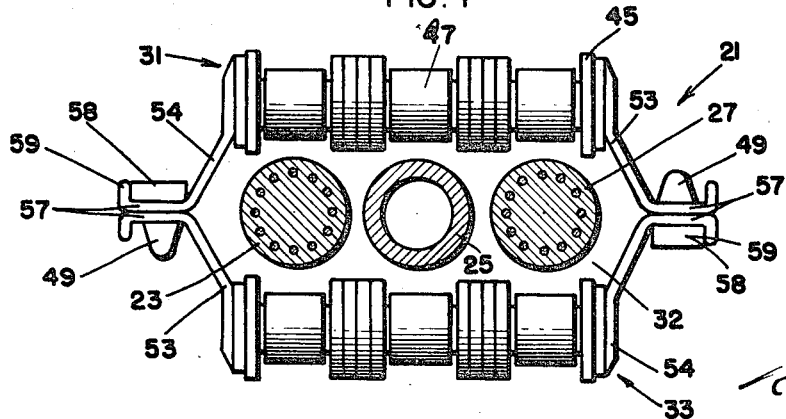
FIG. 4 is a sectional view taken along the line 4—4 of FIG. 3.

The respective carrier plates 53 and 54 for the interlocking pins 49 and slots 51 are in this instance fastened to alternative links of the outer chain strands by means of the common link pins 43. More specifically, the carrier plates 53 and 54 are each formed with a first attaching portion having a pair of apertures to receive the ends of common link pins 43 whereby these fastening portions may be fastened flat against the outer link side plates 45 of the outer chain strands. As best seen in FIG. 4, the carrier plates are bent outwardly at an angle of about 30° from the chain link side plates 45 to provide diverging portions which diverge outwardly from the chains and toward each other to meet at points equidistant from the respecitve chains. The opposed carrier plates 53 and 54 each have outwardly bent faces 57 which abut and hold the triple strand chains 31 and 33 spaced from and parallel to each other and thereby prevent the strand chains 31 and 33 for collapsing inwardly against the cables 23, 25 and 27.

The interlocking pins 49 are formed with an enlarged head 58 seated between the diverging portions and outwardly turned flange 59 (FIG. 4) on the carrier plates 54. The interlock pins 59 have a generally tapered, conically shaped body extending from the pin head 58 and through an aperture in its face 57 and into and through the elongated slot 51 in the opposite carrier plate 53. The slot 51 is elongated in the longitudinal direction of the chain and permits the pin to slide longitudinally in the slot 51 as the triple strand chains bend about curves.

The position of the path of travel of the grapple 29 may be displaced laterally from a position along the center line of the refueling machine 13 through very short distances ranging from a very slight lateral displacement to two feet, in this instance, by the displacement mechanism 41. This is achieved by dividing the composite lifting chain 21 into its two halves and bending them separately about relatively small radii bends within their respective paths of travel in the displacement mechanism 41. In this instance, the displacement mechanism is supported beneath a horizontally disposed platform 40 which includes a central turntable carrying support brackets 61 (FIG. 5) for pivotally mounting a frame 63 of the displacement mechanism for movement about a horizontal pivot axis through a support shaft 67 journaled in bearing mounts 65 carried by the support brackets 61. The displacement mechanism frame is formed by a pair of vertically disposed side plates 69 which are laterally spaced and held parallel to each other by a number of cross rods 71 spanning the side plates 69.

The displacement mechanism frame 63 may pivot to and between limit positions, such as shown in solid lines in FIG. 5 and solid lines in FIG. 6. In the limit position shown in FIG. 6, the displacement mechanism positions the grapple 29 for travel along a path offset laterally from the center line of the refueling machine 13; and, in this position, a stop 72 in the form of pads on the side plates 69 abuts the underside of the platform turntable. In the other limit position shown in solid line in FIG. 5, the grapple 29 is positioned for travel along a path at the center line of the refueling machine with chain 21 passing straight through, and a stop 73 in the form of pads on the side plates 69 abuts the underside of the platform.

To pivot the displacement mechanism 41, a power actuating means of the pneumatic kind is mounted on the platform 40 and has an actuating yoke or arm 74 connected to the displacement frame to cause a pivoting thereof about the axis of shaft 67. In this instance, the pneumatically operated actuating means includes a pneumatic motor 75, which floats on a helium line, and is drivingly connected to a pair of vertically disposed ball screws 76. The lower ends of the ball screw shafts are connected to opposite ends of a common plate 77 at the center of which is attached the upper end of the yoke 74. The yoke is pivotally connected in a suitable manner to a central portion of a horizontally disposed shaft 81 which is journaled for turning in bearing mounts 79 fastened to the side plates 69 of the displacement frame. The shaft 81 is disposed parallel to and spaced from the support shaft 67. The displacement frame 69 may be turned in a clockwise direction as seen in FIG. 5 to shift the lower end of the chain 21 in or to positions at or intermediate the illustrated positions in FIG. 5. A pneumatically operated brake 82 is connected to the motor 75 to hold the displacement at a given position.

As the upper end of the composite chain 21 enters the displacement mechanism 41, the left triple chain 31 is separated from the right triple chain 33 for movement along a path between a first pair of sprockets 83 and 84. The right triple chain 33 moves along a path between a second pair of sprockets 85 and 86 which is of the same length as the path taken by the left triple chain 31. The respective pairs of sprockets hold the triple strand chains 31 and 33 spaced apart for generally parallel movements along the portion of paths between their respective sprockets and the chain paths define a parallelogram whose orientation may be changed without making the path lengths unequal. More specifically, the chain 31 engages the lower right side of the sprocket 83 which is journaled on the shaft 67 extending between the side plates. The triple strand chain 31 extends from the bottom of sprocket 83 to the top of the sprocket 84 which is journaled on a shaft 88 spanning the side plates 69. The right hand triple chain 33 is directed downwardly from the sprocket 83, at which the other chain 31 turns, to the sprocket 85, and about its lower, right quadrant to the top of the sprocket 86. The sprockets 85 and 86 are journaled on support shafts 89 and 90 which are disposed parallel to and lower than the shafts 67 and 88. An idler sprocket 91 holds the chains 31 and 33 against the sprockets 83 and 85.

The triple strand chains 31 and 33 are reunited at the lower end of displacement mechanism by a sprocket 92 journaled on a shaft 93 disposed parallel and between the shafts 88 and 90 for the sprockets 84 and 86. The left hand triple chain 31 runs between the sprockets 84 and 92 and is positioned to bring its interlocking pins 49 into elongated slots 51 in the other triple chain 33. The distance between the upper sprockets 83 and 84 for the upper triple strand chain 31 and the distance between lower sprockets 85 and 86 are substantially equal so that the interlocking pins 49 insert through the same slots they previously retracted from when separating.

The chain displacement mechanism 41 is supported on a circular turntable or support 95, as best seen in FIG. 10, for turning to each of a plurality of angularly spaced positions. To this end, the turntable 95 is centrally disposed in a circular opening in the platform 40 and is mounted in an annular bearing 97 which has an outer race 98 fixed to the stationary platform 40. The turntable is turned with operation of a driving means in the form of a pneumatic motor 99 mounted on the turntable and driving a gear 100 which is meshed with an interial ring gear 101 fastened to the top of the stationary bearing race 98. The pneumatic motor 99 is connected through a pneumatically operated brake 102 to a drive for the gear 100. The turntable is stopped in any one of six positions at which the grapple 29 may be positioned for aligned movement and connection to plugs, fuel chutes, core elements or the like. To assist in alignment, a lock arrangement is provided including a pneumatically operated locking pin 103 for insertion into one of the six locating sockets 104, as best seen in FIG. 11. Thus, when the chain displacement mechanism 41 is laterally offsetting the composite chain 21 and grapple 29, they may be positioned in each of the angularly spaced six positions.

As previously explained, the compact storage of the lifting chain 21 is achieved by separating the triple strand chains 31 and 33 and winding the chains in obround coils on the reels 34. The chains 31 and 33 are meshed with and are separated by a pair of idler sprockets 105 and 106 which are journaled on spaced, horizontally disposed shafts 107 mounted in a supporting frame 108 carried by the turntable 95. From the idler sprockets, the separated chains diverge and move to and about upper drive sprockets 109 which are mounted on horizontally disposed shafts 110. From these synchronized drive sprockets, the chains extend downwardly to endless winding chains 111 which have an offset connector 113 to which are connected the ends of the respective triple strand chains 31 and 33. The endless chains 111 extend between the lower sprocket 35 and the upper drive sprocket 36 and are driven by the latter for movement about the sprockets in an obround path. Shafts 115 carrying the sprockets are suitably supported in the frame 108 and carry large discs 116 fixed to and spaced on the shafts to hold the chain loops against laterally shifting.

Briefly, the drive sprockets 36 for the respective reels are driven to wind or unwind the chains with operation of pneumatically operated, gear motors 117. These gear motors are driven by helium gas and have pinions 118 driving large gears 119 and gear trains, not illustrated, and drives so that the endless chains 111 are driven in forward or reverse directions and also at fast or slow speeds. For example, the chain and grapple may be lifted and wound at slow speeds of 3 or 6 feet/min. and a fast speed of 30 feet/min.

Figure 7:
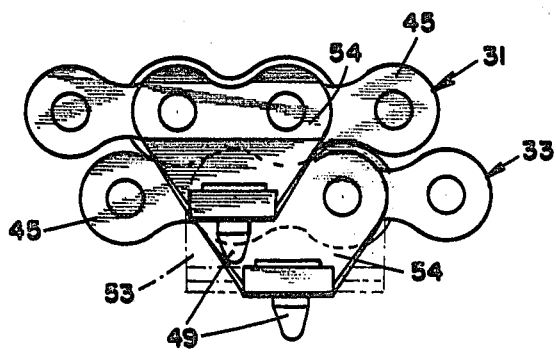
FIGS. 7 and 8 are fragmentary illustrations of positions of superimposed chains when wound for storing.
Figure 8:
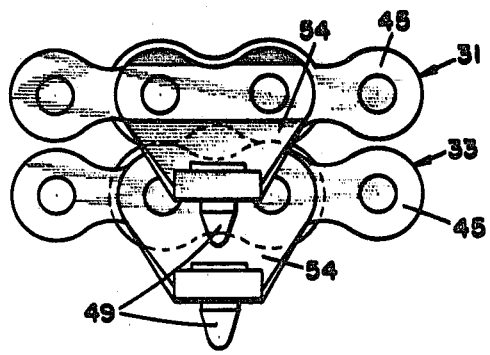

As best seen in FIGS. 7 and 8, the obround coils of the respective triple strand chains 31 and 33 will lay and nest one upon another during winding, and this is facilitated by the 30° divergence of the respective carrier plates 53 and 54 which serve to guide and cam each wrapping portion into overlying and nested position over the proceeding coil or wrap of the chain. The interlock pins 49 do not interfere with the coiling as the abutted chain link plates 45 hold them spaced from one another.

Figure 9:
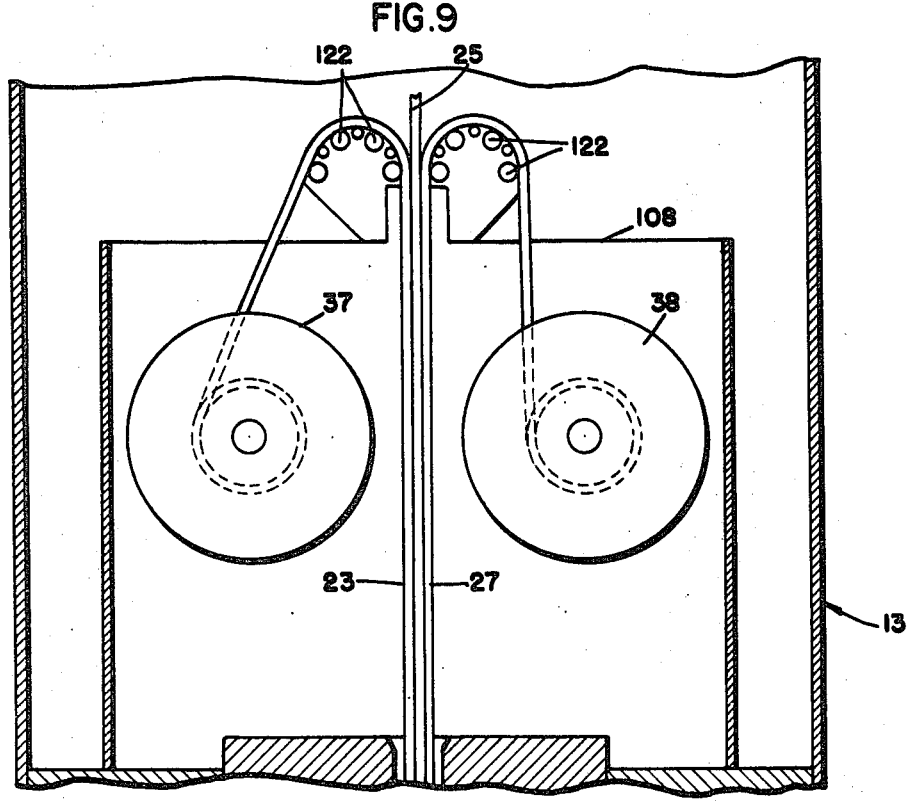
FIG. 9 illustrates winding reels for a pair of electrical service lines.

As the triple strand chains 31 and 33 separate at the idler sprockets 105 and 106, the electrical service lines 23 and 27 also separate and move outward therefrom and in a plane at right angles thereto, as best seen in FIG. 11. The electrical service lines are guided by a series of spaced guide rollers 122 on the frame 108, as seen in FIG. 9, which bend the electrical lines without exceeding their minimum allowable bending radius. From the roller guides 122, the electrical lines extend downwardly to their winding reels 37 and 38 on which they are wound. These reels are kept under adequate winding torque by pneumatic gear motors 123 (FIG. 11) which float on a constant pressure supply line of helium gas. Suitable pneumatically controlled brakes 126 are also provided for breaking the reels 37 and 38. The pneumatic service line 25 moves upwardly to a similar reel 39 which is located above the electrical service line reels 37 and 38 and which is driven by a similar pneumatic motor 124 and braked by a pneumatically controlled brake 126.

From the foregoing, it will be seen that the composite lifting chain protects the electrical or pneumatic service lines against damage during use of the chain. Also, the composite lifting chain meets the requirements of lifting heavy loads while being relatively lightweight. Additionally, the composite chain does not require frequent lubrication to prevent wear and does not contain organic or other materials which cannot be exposed to high temperatures. As the first and second chains are capable of being automatically separated from one another, the separated chains may bend about turns of relatively short radius, as in the displacement mechanism or in reel mechanisms storing the chain.

It will be appreciated that the composite lifting chain and the lifting mechanism are capable of uses other than in a nuclear reactor, fuel handling machine; but they are of particular utility as a part of a machine for lifting and lowering loads to and from a nuclear reactor core. Moreover, the turntable and the chain displacement mechanism coact with the chain in aligning the grapple with the various devices and core elements stored at radially and arcuately spaced locations within the vessel.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A lifting mechanism comprising a composite chain having separable and interlockable first and second chains, releasable interlocking means for locking said first and second chains together, and chain displacement means for separating the first and second chains from each other and bending the respective chains about radii and reuniting said first and second chains at a position spaced laterally of the incoming position for said chains.

2. A lifting mechanism in accordance with claim 1 in which the displacement means includes means to guide said first chain along a first path having a curved portion and means to guide said second chain along a second path having curved portions spaced from said first path, said guiding means providing paths of substantially the same length, said paths substantially defining a parallelogram between points of separation and reunion.

3. A lifting mechanism in accordance with claim 2 in which said guide means includes pairs of spaced sprockets about which the chains are entrained and guided along paths having portions which are parallel to each other.

4. A lifting mechanism in accordance with claim 3 in which the displacement means includes a pivotally mounted frame carrying said sprockets and includes means for pivoting said frame to position said chain outlet at various angular spaced positions relative to the chain inlet whereby the amount of lateral displacement of the chain may be varied.

5. A composite lifting chain comprising first and second chains adapted to cooperate to lift a load, means extending between said chains and holding the same at spaced positions to define inner space, at least one flexible service line in said inner space for protection by said chains, and means for interlocking said first and second chains together and for permitting said first and second chains to separate automatically, said means for interlocking said first and second chains includes alternately spaced projecting pins fixed to said first chain with pin receiving slots intermediate said projecting pins and alternately spaced projecting pins fixed to said second chain with pin receiving slots intermediate said projecting pins, said first chain projecting pins and pin receiving slots for receiving said second chain pin receiving slots and projecting pins respectively, said slots being elongated in the longitudinal direction of said chains to permit said pins to slide longitudinally in said slots.

6. A composite, flexible lifting chain in accordance with claim 5 in which said first and second chains are multiple strand, roller chains and in which said releasable locking means holds the multiple strand, roller chains spaced at predetermined distances from each other.

7. A composite chain in accordance with claim 6 in which said means for spacing said first and second chains include carriers fastened to the outer sides of the chains, and in which portions of said carriers diverge laterally outward from the respective chains and toward each other to meet at positions spaced laterally outwardly of sides of the respective chains to guide and center adjacent coils of the chains.

8. A machine for lifting and lowering loads to and from a nuclear reactor core comprising a vessel adapted to be sealingly connected to said reactor core, a lifting mechanism in said vessel, a composite chain in said lifting mechanism for attachment to a load and including fist and second chains, said first and second chains having an internal protected space therebetween, means for releasably interlocking said first and second chains together and permitting said chains to separate from one another to facilitate storing or bending, at least one service line disposed in said protected space and protected by said first and second chains, and reeling means in said lifting means for winding and unwinding said first and second chains.

9. A machine in accordance with claim 8 in which said reeling means includes first and second reel mechanisms each for winding one of the first and second chains in an obround coil.

10. A machine in accordance with claim 8 including a chain displacement mechaanism for separating the first and second chains and moving the same through equidistant paths and then reuniting said first and second chains at an outgoing position which is laterally offset from that of the composite chain incoming to said displacement mechanism.

11. A machine in accordance with claim 10 including a turntable mounted for turning movement about an axis within said vessel for positioning said chain displacement mechanism so that the outgoing position for the composite chain may be in any one of several locations spaced radially and arcuately about said axis of turntable movement.

References Cited
UNITED STATES PATENTS

| | | | |
|---|---|---|---|
| 2,896,908 | 7/1959 | Stone | 254—1 |
| 3,082,893 | 3/1963 | Hollings et al. | 176—30 |
| 3,383,286 | 5/1968 | Paget | 176—30 |

FOREIGN PATENTS

| | | | |
|---|---|---|---|
| 927,798 | 5/1955 | Germany | 254—135 |
| 971,285 | 9/1964 | Great Britain | 254—135 |

EVON C. BLUNK, Primary Examiner

M. F. MAFFEI, Assistant Examiner

U.S. Cl. X.R.

214—1; 242—54; 254—135